US011160102B2

(12) United States Patent
Davydov et al.

(10) Patent No.: US 11,160,102 B2
(45) Date of Patent: Oct. 26, 2021

(54) FULL DUPLEX SUPPORT IN FIFTH GENERATION (5G) SYSTEMS

(71) Applicant: Apple Inc., Cupertino, CA (US)

(72) Inventors: Alexei Davydov, Nizhny Novgorod (RU); Gregory V. Morozov, Niznhy Novgorod (RU); Victor Sergeev, Nizhny Novgorod (RU); Hong He, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 193 days.

(21) Appl. No.: 16/079,854

(22) PCT Filed: Jun. 23, 2016

(86) PCT No.: PCT/US2016/038952
§ 371 (c)(1),
(2) Date: Aug. 24, 2018

(87) PCT Pub. No.: WO2017/164900
PCT Pub. Date: Sep. 28, 2017

(65) Prior Publication Data
US 2019/0059099 A1 Feb. 21, 2019

Related U.S. Application Data

(60) Provisional application No. 62/313,567, filed on Mar. 25, 2016.

(51) Int. Cl.
*H04W 72/12* (2009.01)
*H04B 7/06* (2006.01)
(Continued)

(52) U.S. Cl.
CPC ...... *H04W 72/1289* (2013.01); *H04B 7/0617* (2013.01); *H04B 7/0691* (2013.01); *H04L 5/14* (2013.01); *H04W 72/044* (2013.01)

(58) Field of Classification Search
None
See application file for complete search history.

(56) References Cited

U.S. PATENT DOCUMENTS

2002/0090978 A1*  7/2002  Petrus ................. H04B 7/0617
                                                                455/562.1
2007/0230324 A1* 10/2007  Li ........................ H04L 1/0026
                                                                370/204
(Continued)

OTHER PUBLICATIONS

International Search Report dated Nov. 22, 2016 for International Application PCT/US2016/038952.
(Continued)

*Primary Examiner* — Ajit Patel
*Assistant Examiner* — Richard Schnell
(74) *Attorney, Agent, or Firm* — Eschweiler & Potashnik, LLC

(57) ABSTRACT

Techniques for full duplex operation of base stations and/or user equipments (UEs) are discussed. One example embodiment comprises one or more processors of a UE configured to: process control messages that comprise a downlink assignment for the UE and an uplink grant for the UE during a subframe in a frequency band, wherein the downlink assignment indicates a first set of UE subarrays, and wherein the uplink grant indicates a second set of UE subarrays; process downlink data received via transceiver circuitry via the first set of UE subarrays, wherein the downlink data is received from a first base station during the subframe via the frequency band; and output uplink data to the transceiver circuitry for transmission via the second set of UE subarrays, wherein the uplink data is output for transmission to a second base station during the subframe via the frequency band.

18 Claims, 9 Drawing Sheets

(51) Int. Cl.
*H04L 5/14* (2006.01)
*H04W 72/04* (2009.01)

(56) References Cited

U.S. PATENT DOCUMENTS

| | | | | |
|---|---|---|---|---|
| 2010/0233973 | A1* | 9/2010 | Churan | H01Q 3/2605 455/114.2 |
| 2011/0243040 | A1 | 10/2011 | Khan et al. | |
| 2013/0171998 | A1* | 7/2013 | Liu | H04W 16/28 455/446 |
| 2013/0286960 | A1* | 10/2013 | Li | H04B 7/0684 370/329 |
| 2013/0329685 | A1* | 12/2013 | Fujimoto | H04L 5/0048 370/329 |
| 2015/0092621 | A1 | 4/2015 | Jalloul et al. | |
| 2015/0124673 | A1* | 5/2015 | Ouchi | H04W 52/362 370/311 |
| 2015/0372793 | A1* | 12/2015 | Kang | H04L 5/0048 370/329 |
| 2017/0005776 | A1* | 1/2017 | Kim | H04B 1/525 |
| 2018/0109305 | A1* | 4/2018 | Obara | H04B 7/0695 |
| 2019/0123800 | A1* | 4/2019 | Takeda | H04W 72/12 |

OTHER PUBLICATIONS

Boccardi, Federico et al. "Why to Decouple the Uplink and Downlink in Cellular Networks and How to Do It." IEEE Communications Magazine, IEEE Service Center, Piscataway, US. vol. 54, No. 3, Mar. 1, 2016. pp. 110-117.

3rd Generation Partnership Project; Technical Specification Group Radio Access Network; Study on elevation beamforming/Full-Dimension (FD) Multiple Input Multiple Output (MIMO) for LTE (Release 13). 3GPP TR 36.897 V13.0.0 (Apr. 2015). 58 pages.

Molloi, Sabee et al. "Qantification of coronary arterial calcium by dual energy digital subtraction fluoroscopy." 2389 Medical Physics. 18 Mar./Apr. 1991, No. 2, New York. XP000228816. 4 pages.

Wen Di, et al. "Coronary calcium visualization using dual energy chest radiography with sliding organ registration." Medical Imaging 2016: Image Processing. Proc. of SPIE vol. 9784, 97840W-1. 8 pages.

Rasheed, Tahir et al. "Rib Suppression in Frontal Chest Radiographs: A Blind Source Separation Approach." 2007 IEEE. 4 pages.

Sharma, Rakesh K. et al. "Cardiac risk stratification: Role of the coronary calcium score." Vascular Health and Risk Management 2010:6 603-611. Dovepress.

Xu, Tong et al. "Feasibility of real time dual-energy imaging based on a flat panel detector for coronary artery calcium quantification." Med. Phys. 33 (6), Jun. 2006. 2006 Am. Assoc. Phys. Med. 8 pages.

* cited by examiner

FULL DUPLEX SUPPORT IN FIFTH GENERATION (5G) SYSTEMS

REFERENCE TO RELATED APPLICATIONS

This application is a National Phase entry application of International Patent Application No. PCT/US2016/038952 filed Jun. 23, 2016, which claims priority to U.S. Provisional Application 62/313,567 filed on Mar. 25, 2016, entitled "FULL DUPLEX SUPPORT IN 5G SYSTEMS" in the name of Alexei Davydov et al. and is hereby incorporated by reference in its entirety.

FIELD

The present disclosure relates to wireless technology, and more specifically to techniques for implementing full duplex operation in fifth generation (5G) systems.

BACKGROUND

In order to satisfy the ever-increasing demand for data, 5G radio access technologies (RATs) can employ a variety of techniques to increase bandwidth and reduce latency, which can include beamformed transmission and reception, and full duplex (e.g., simultaneous transmission and reception) operation.

DETAILED DESCRIPTION

Figure 1:
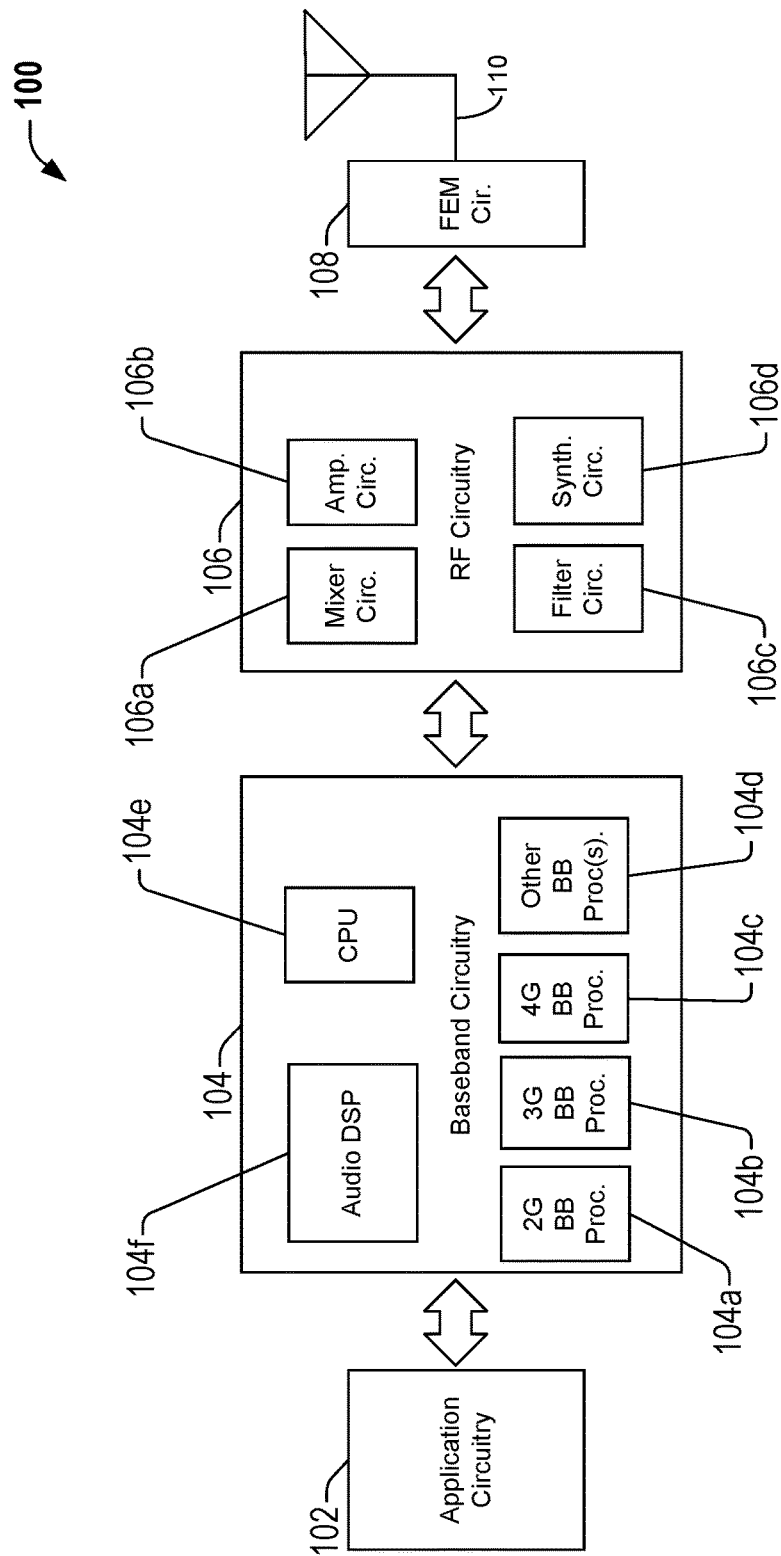
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates, for one embodiment, example components of a User Equipment (UE) device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuity 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the UE device 100 may include additional elements such as, for example, memory/storage, display, camera, sensor, and/or input/output (I/O) interface.

Additionally, although the above example discussion of device 100 is in the context of a UE device, in various aspects, a similar device can be employed in connection with a base station (BS) such as an Evolved NodeB (eNB).

Various aspects discussed herein can facilitate full duplex operation in a wireless system. In aspects, the system can operate at a high frequency (e.g., above 30 GHz), where the downlink (DL) and uplink (UL) can be simultaneously multiplexed on a common carrier frequency via different subarrays. In aspects, various techniques described herein can be implemented to facilitate full duplex operation. These techniques can include one or more of: DL/UL subframe configuration that is specific to UEs and/or to subarrays (e.g., of UEs or eNBs, etc.); dynamic signaling of the number of APs (antenna ports) for CSI-RS (channel state information reference signal(s)) and/or SRS (sounding reference signal(s)); and/or signaling of DL/UL transmission(s) for UE(s) on a per subarray level, which can comprise corresponding signal parameters and/or non-overlapping DL/UL resource allocations for an operating frequency band.

Figure 2:
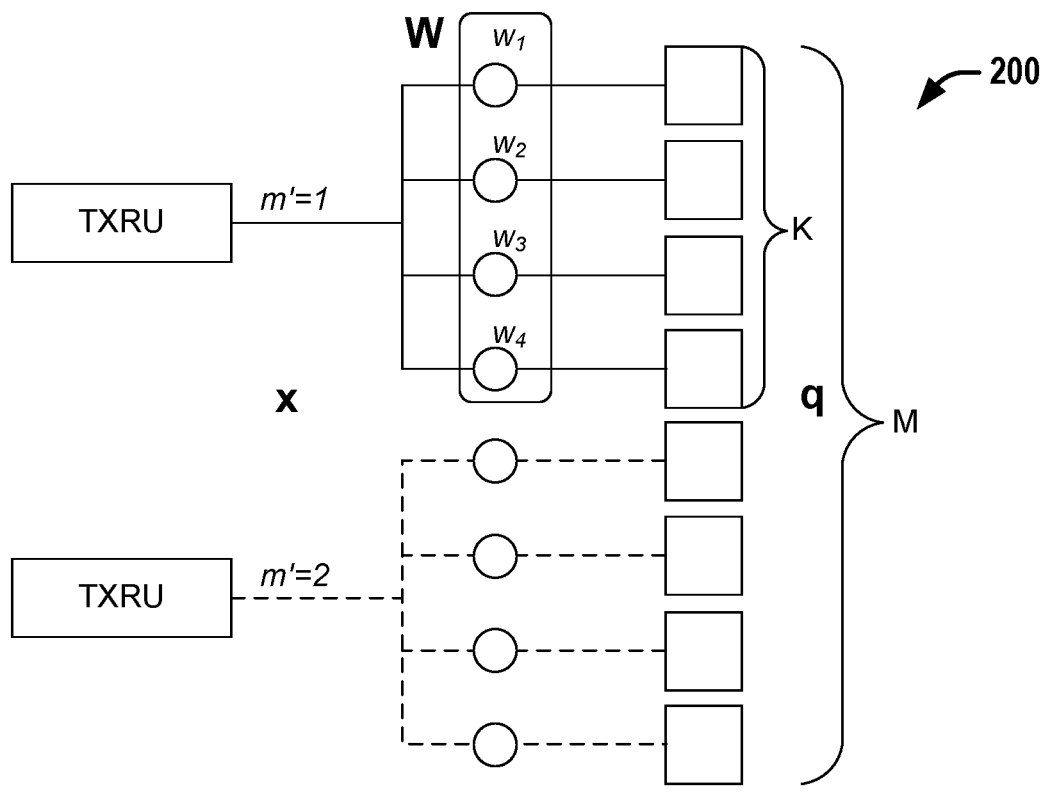
FIG. 2 is a pair of diagrams illustrating two distinct subarray models that can be employed in connection with various aspects described herein.
Figure 2:
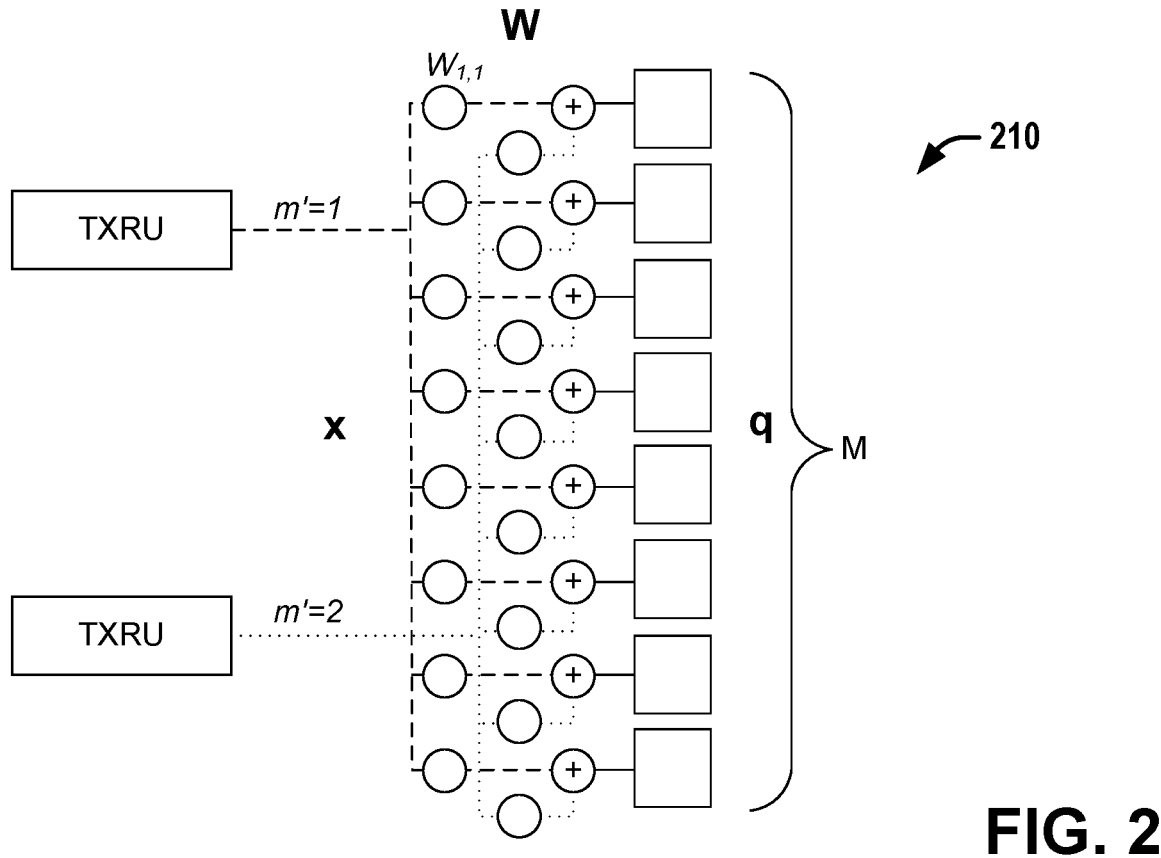

Two types of sub-array models are specified in 3GPP (Third Generation Partnership Project) TR (Technical Report) 36.897, both of which can be described by the combining weights W applied on the physical antennas of the subarray. Referring to FIG. 2, illustrated is a pair of diagrams showing two distinct subarray models, 200 and 210, that can be employed in connection with various aspects described herein. For ease of illustration, two transceiver units (TXRUs) eight physical antennas (M=8) are shown (with four physical antennas per subarray (K=4) in model 200) for each of models 200 and 210, although in various embodiments, each of these values can be greater or lesser. As can be seen in FIG. 2, model 200 comprises distinct subarrays, with each physical antenna part of a distinct subarray and associated with a single distinct TXRU (e.g., m'=1 or m'=2). In contrast, model 210 is a full connection model, with each physical antenna part of a common subarray and associated with a plurality (e.g., all) TXRUs. The vector or matrix of combining weights applied are indicated via W, with individual components or elements indicated via $w_i$ or $w_{i,j}$, respectively.

A system operating in a high frequency band is more likely to use the antenna subarray model 200 due to the simplicity of the antenna connection network. The number of antenna elements in the subarray can be relatively high, which can compensate for path loss at the high frequency bands via narrow beamforming procedures. The beamforming procedures on the subarray can be used to avoid or minimize possible interference between subarrays. Various embodiments discussed herein can be employed via a subarray architecture such as model 200, although in various aspects, similar techniques can also be employed in connection with architectures such as model 210 (which can operate similarly to model 200 in aspects, depending on the combining weights applied).

Full duplex (or simultaneous transmit and receive (STR)) techniques which can support simultaneous transmit and receive in the same frequency band at the same time can potentially double the spectral efficiency. Compared to half-duplex (HD), a FD (full duplex) system is associated with significant interference between its transmission and receiver chain. Recent techniques from industry and academics demonstrate more than 120 dB interference cancellation for full-duplex systems and thus can enable potential applications of full-duplex operation in real wireless cellular systems. However, unlike point-to-point FD systems, a FD cellular network has more complicated interference environments, which includes base station to base station (BS-to-BS) interference in the uplink (UL) receiver and UE-to-UE interference in the downlink (DL) receiver. For cellular systems such as LTE (Long Term Evolution), UEs transmitting UL signals create conventional co-channel interference to other UL signals in other cells.

A full duplex system can be considered as a potential candidate for 5G systems. For high frequency bands, in various aspects discussed herein, beamforming at the antenna subarrays can be employed to minimize the mutual interference between DL and UL transmissions.

Figure 3:
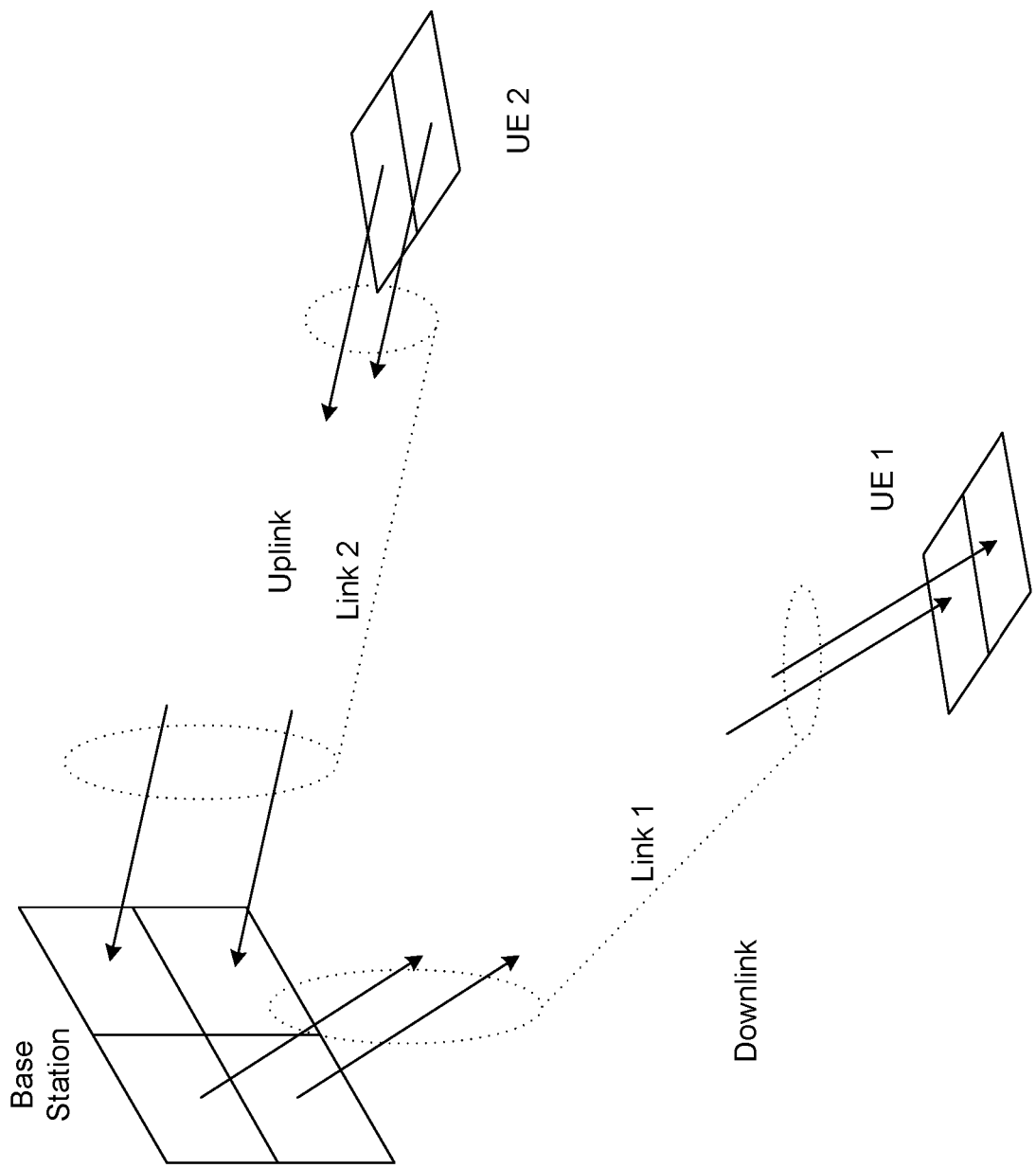
FIG. 3 is a diagram illustrating a first example scenario of full duplex (FD) operation, involving FD operation of a base station (BS) such as an Evolved NodeB (eNB) according to various aspects described herein.

Referring to FIG. 3, illustrated is a diagram of a first example scenario of full duplex operation, involving FD operation of a base station (BS) such as an eNB according to various aspects described herein. According to the example scenario, the BS simultaneously serves two UEs using DL and UL transmissions on the same carrier frequency (in various aspects, a BS can also communicate via a FD mode via other numbers of UEs, as well). The beamforming configuration at the BS antenna subarrays can be selected in such a way as to minimize the interference created by the DL transmission to the UL reception. To support such aspects, the DL/UL configuration according to aspects described herein can support UE-specific assignment.

Given the dynamic nature of DL and UL switching, in aspects, the subarray UL/DL assignment can be also dynamic. As the result, the number of antenna ports (APs) used for CSI-RS (Channel State Information Reference Signal) transmission can be different from one DL subframe to another DL subframe. Therefore, the number of CSI-RS APs can be dynamically controlled at the BS by physical layer downlink control signaling (e.g., via downlink control information (DCI) messaging sent via a physical downlink control channel (PDCCH), etc.). For example, the downlink control indicator can contain information on an actual number of CSI-RS antenna ports for a subframe.

Figure 4:
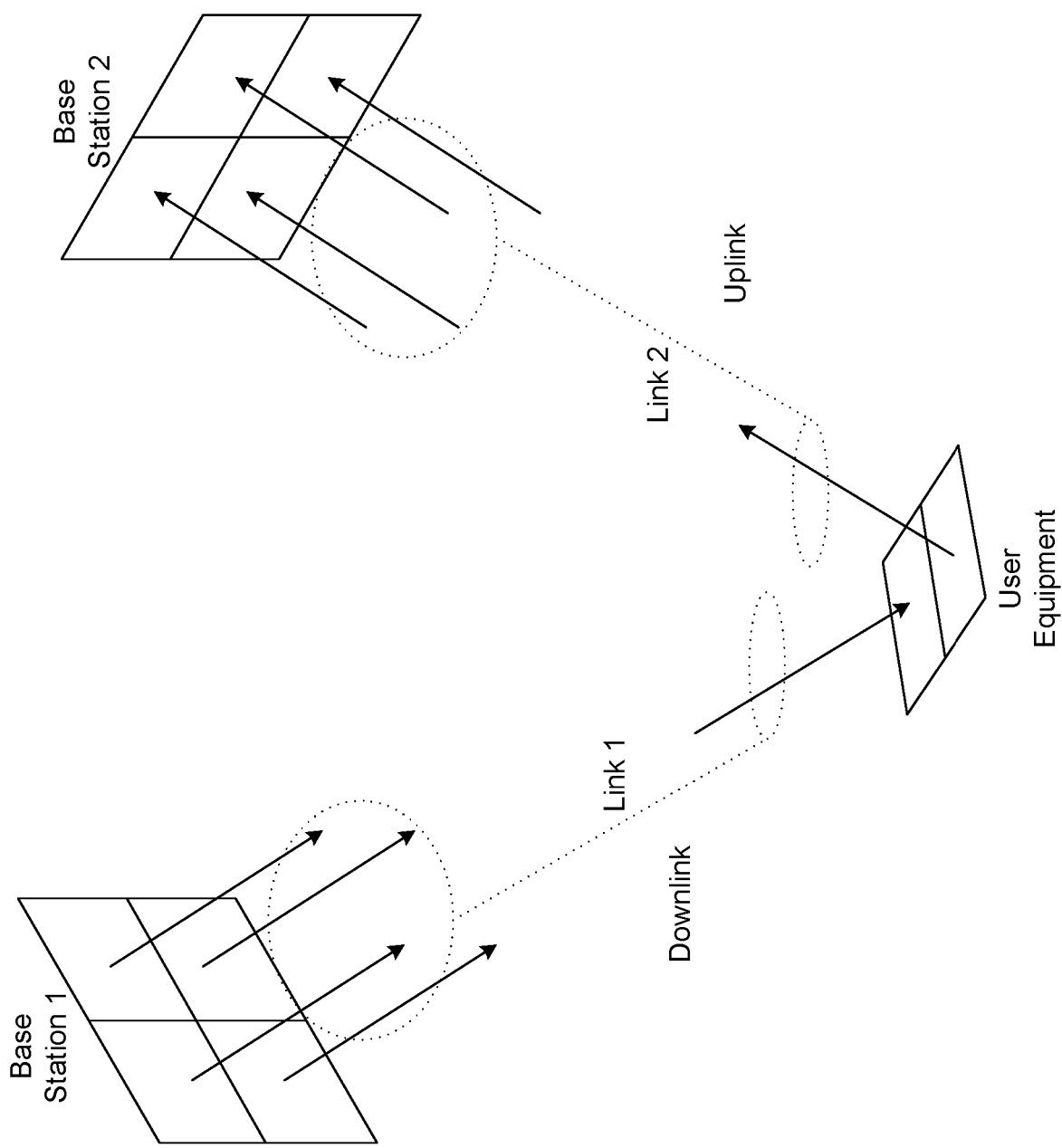
FIG. 4 is a diagram illustrating a second example scenario of full duplex operation, involving FD operation of a user equipment (UE) according to various aspects described herein.

Referring to FIG. 4, illustrated is a diagram of a second example scenario of full duplex operation, involving FD operation of a UE according to various aspects described herein. According to the example of FIG. 4, the UE simultaneously transmit and receive signals to and/or from the BS. The DL and UL transmissions can be performed on the same carrier frequency, but from different antenna subarrays. The beamforming configuration at the UE antenna subarrays can be selected in such way to minimize the interference created by the UL transmission on the DL reception. To facilitate such aspects, in various embodiments, the DL/UL configuration can be indicated per subarray of the UE.

Given the dynamic nature of DL and UL switching, the subarray UL/DL assignment also can be dynamic in various aspects described herein. As a result, the number of antenna ports used for SRS (sounding reference signal) transmission can be different from one UL subframe to another UL subframe.

Therefore, in aspects, the number of SRS antenna ports can be dynamically controlled at the BS by physical layer downlink control signaling. For example, the downlink control indicator can contain information on the actual number of SRS antenna ports for the UE (e.g., for a given subframe).

Additionally, although FIG. 3 only illustrates FD operation at the BS, in various aspects, FD operation can also be employed by one or more of the UEs communicating with the BS that is employing FD operation in FIG. 3. Similarly, although FIG. 4 only illustrates FD operation at the UE, in various aspects, FD operation can also be employed by one or more of the BSs communicating with the UE that is employing FD operation in FIG. 4.

Figure 5:
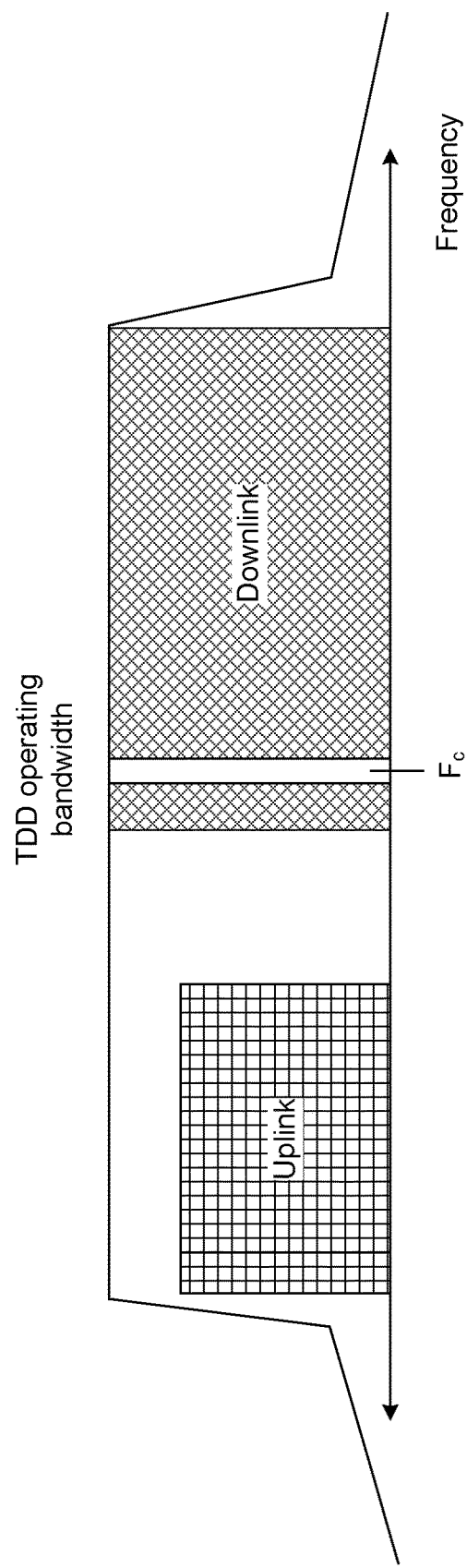
FIG. 5 is a diagram illustrating an example allocation of non-overlapping allocations of subcarriers for UL (uplink) and DL (downlink) transmissions for FD operation, according to various aspects described herein.

In any of these embodiments (e.g., FD operation at a BS, FD operation at a UE, or a combination of both), interference can be minimized via a variety of techniques. For example, the used (e.g., allocated) subcarriers for DL and UL transmission can be different within the frequency band. Referring to FIG. 5, illustrated is a diagram showing an example allocation of non-overlapping allocations of subcarriers for UL and DL transmissions for FD operation, according to various aspects described herein. Non-overlapping allocations for DL/UL can be used for a full duplex system in various aspects, which can emulate FDD (frequency division duplexing) systems, which have uplink and downlink operating on different carrier frequency. In other aspects, overlapping allocations for DL/UL transmissions can be employed.

Figure 6:
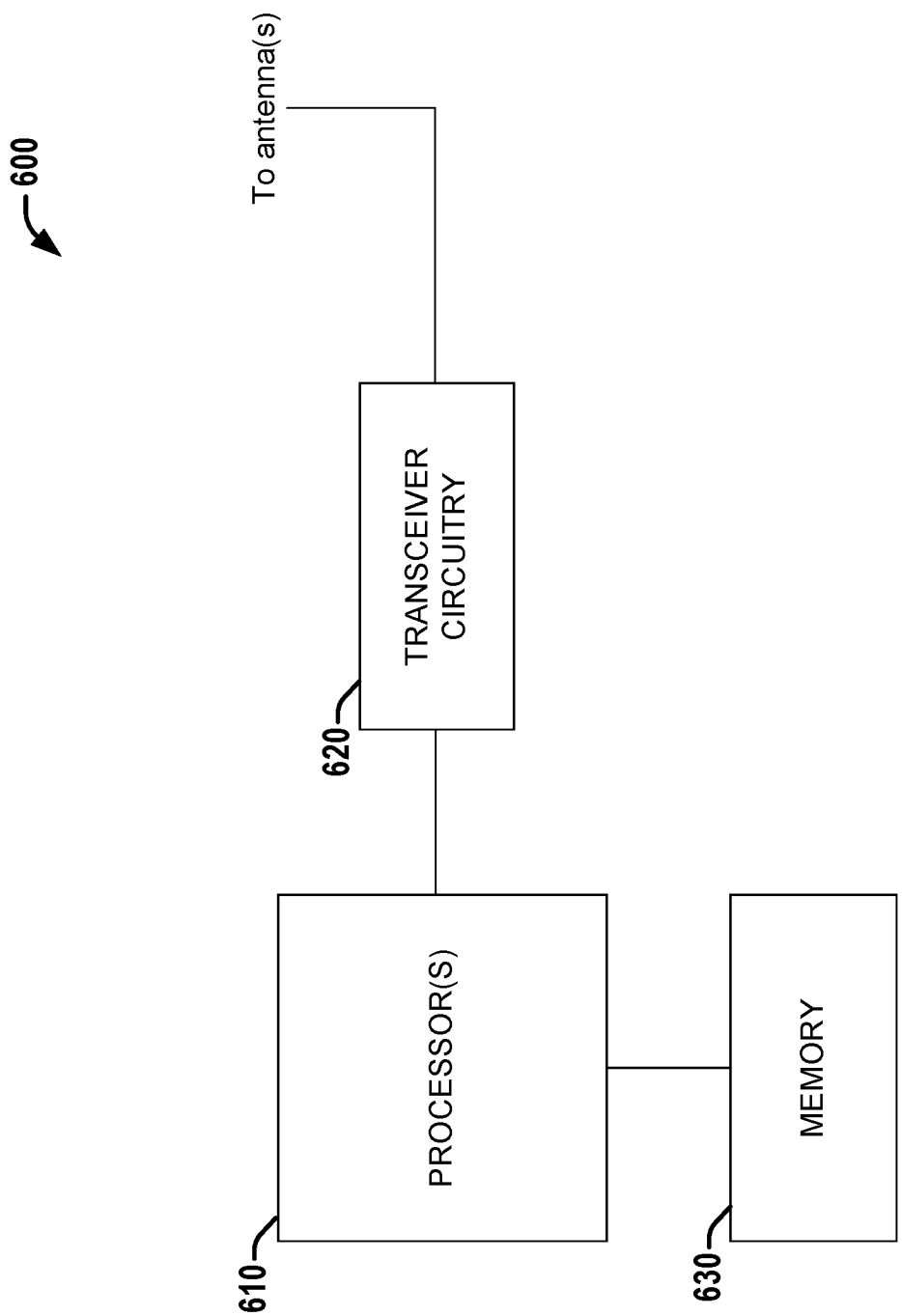
FIG. 6 is a block diagram illustrating a system that facilitates full duplex (FD) operation at a base station according to various aspects described herein.

Referring to FIG. 6, illustrated is a block diagram of a system 600 that facilitates full duplex (FD) operation at a base station according to various aspects described herein. System 600 can include one or more processors 610 (e.g., one or more baseband processors such as one or more of the baseband processors discussed in connection with FIG. 1), transceiver circuitry 620 (e.g., which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 630 (which can comprise any of a variety of storage mediums and can store instructions and/or data associated with one or more of processor(s) 610 or transceiver circuitry 620). In various aspects, system 600 can be included within an Evolved Universal Terrestrial Radio Access Network (E-UTRAN) Node B (Evolved Node B, eNodeB, or eNB) or other base station in a wireless communications network. In some aspects, the processor(s) 610, transceiver circuitry 620, and the memory 630 can be included in a single device, while in other aspects, they can be included in different devices, such as part of a distributed architecture. As described in greater detail below, system 600 can facilitate simultaneous transmission and reception by the eNB.

Processor(s) 610 can schedule a DL transmission and a UL transmission in a common subframe. In aspects, processor(s) 610 can schedule the DL transmission to a first UE, to be transmitted via a first link, which can comprise a first set of eNB subarrays for transmission and a first set of UE subarrays (e.g., of the first UE) for reception. In aspects, processor(s) 610 can schedule the UL transmission from a second UE, to be transmitted via a second link, which can comprise a second set of eNB subarrays for reception and a second set of UE subarrays (e.g., of the second UE) for transmission.

In some situations, processor(s) 610 can schedule the DL transmission and the UL transmission to partially or wholly overlapping sets of time domain resources (e.g., sets of one or more OFDM (orthogonal frequency division multiplexing) symbols), although they need not be.

In various embodiments discussed herein, processor(s) 610 can schedule both the DL transmission and the UL transmission to a common frequency band. In various aspects, to mitigate interference, processor(s) 610 can schedule the DL transmission and the UL transmission to non-overlapping sets of frequency domain resources (e.g., sets of subcarriers of a common frequency band, etc.). In other aspects, processor(s) 610 can schedule the DL transmission and the UL transmission to partially or wholly overlapping sets of frequency domain resources. In aspects, processor(s) 610 can schedule the DL transmission to a subset of a set of frequency domain resources allocated for DL transmissions (to the first UE and/or to other UEs), and can schedule the UL transmission to a subset of a set of frequency domain resources allocated for UL transmissions (from the second UE and/or from other UEs), such as the example allocation shown in FIG. 5. In such aspects, processor(s) 610 can allocate frequency domain resources based on a predetermined allocation, or a dynamic allocation that can (but need not) vary from subframe to subframe and/or from cell to cell, and in such aspects can be allocated based at least in part on DL/UL traffic demands, intercell interference mitigation, etc.

Processor(s) 610 can generate a plurality of DCI (downlink control information) messages comprising a first DCI message indicating a DL assignment to the first UE in connection with the scheduled DL transmission, and a second DCI message indicating a UL grant to the second UE in connection with the scheduled UL transmission.

Processor(s) 610 can output the plurality of DCI messages to transceiver circuitry 620, which can comprise outputting the first DCI message for transmission to the first UE and the second DCI message for transmission to the second UE. Depending on the type of signal or message generated, outputting for transmission (e.g., by processor(s) 610, processor(s) 710, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.).

In some aspects, the first DCI message can indicate that the subframe is a DL subframe for the first UE and/or for the first set of UE subarrays. Similarly, in some aspects, the second DCI message can indicate that the subframe is a UL subframe for the second UE and/or for the second set of UE subarrays. In some situations, as discussed herein, the subframe can be a DL subframe or UL subframe for all subarrays of a UE (e.g., the first UE or the second UE). In other situations, however, the subframe can be a DL subframe for a first set of subarrays of a UE (e.g., the first UE or the second UE) and simultaneously can be an UL subframe for a second set of subarrays of that UE.

In aspects, whether the subframe is a DL subframe or an UL subframe can vary between UEs and/or between sets of subarrays. Thus, in various embodiments, the first DCI message can indicate a number of APs for CSI-RS associated with the DL transmission. Similarly, in various embodiments, the second DCI message can indicate a number of APs for SRS associated with the UL transmission.

Processor(s) 610 can output a set of DL data to transceiver circuitry 620 for transmission to the first UE during the subframe via the first set of eNB subarrays. In various aspects, processor(s) 610 can select a first set of beamforming weights (e.g., associated with the first UE) to be applied to the first set of eNB subarrays to facilitate transmission of the set of DL data by transceiver circuitry 620.

Additionally, transceiver circuitry 620 can receive via the second set of eNB subarrays, and processor(s) 610 can process, a set of UL data from the second UE during the subframe. Depending on the type of received signal or message, processing (e.g., by processor(s) 610, processor(s) 710, etc.) can comprise one or more of: identifying physical resources associated with the signal/message, detecting the signal/message, resource element group deinterleaving, demodulation, descrambling, and/or decoding. In various aspects, processor(s) 610 can select a second set of beamforming weights (e.g., associated with the second UE) to be applied to the second set of eNB subarrays to facilitate reception of the set of UL data by transceiver circuitry 620.

In various embodiments, the first UE and the second UE can be distinct UEs, although they need not be distinct (in such situations, additional interference mitigation techniques (e.g., non-overlapping frequency resources for UL and DL, etc.) can be employed, or potentially distinct links with sufficient spatial separation (e.g., due to reflection) can be employed for UL and DL between the eNB and UE, if available). In aspects, the first set of beamforming weights for the first set of eNB subarrays and/or the second set of beamforming weights for the second set of eNB subarrays can be selected by processor(s) 610 to minimize an interference (or reduce the interference below a threshold level) between the DL transmission and the UL transmission (e.g., to minimize or reduce an interference caused on the UL transmission by the DL transmission).

Figure 7:
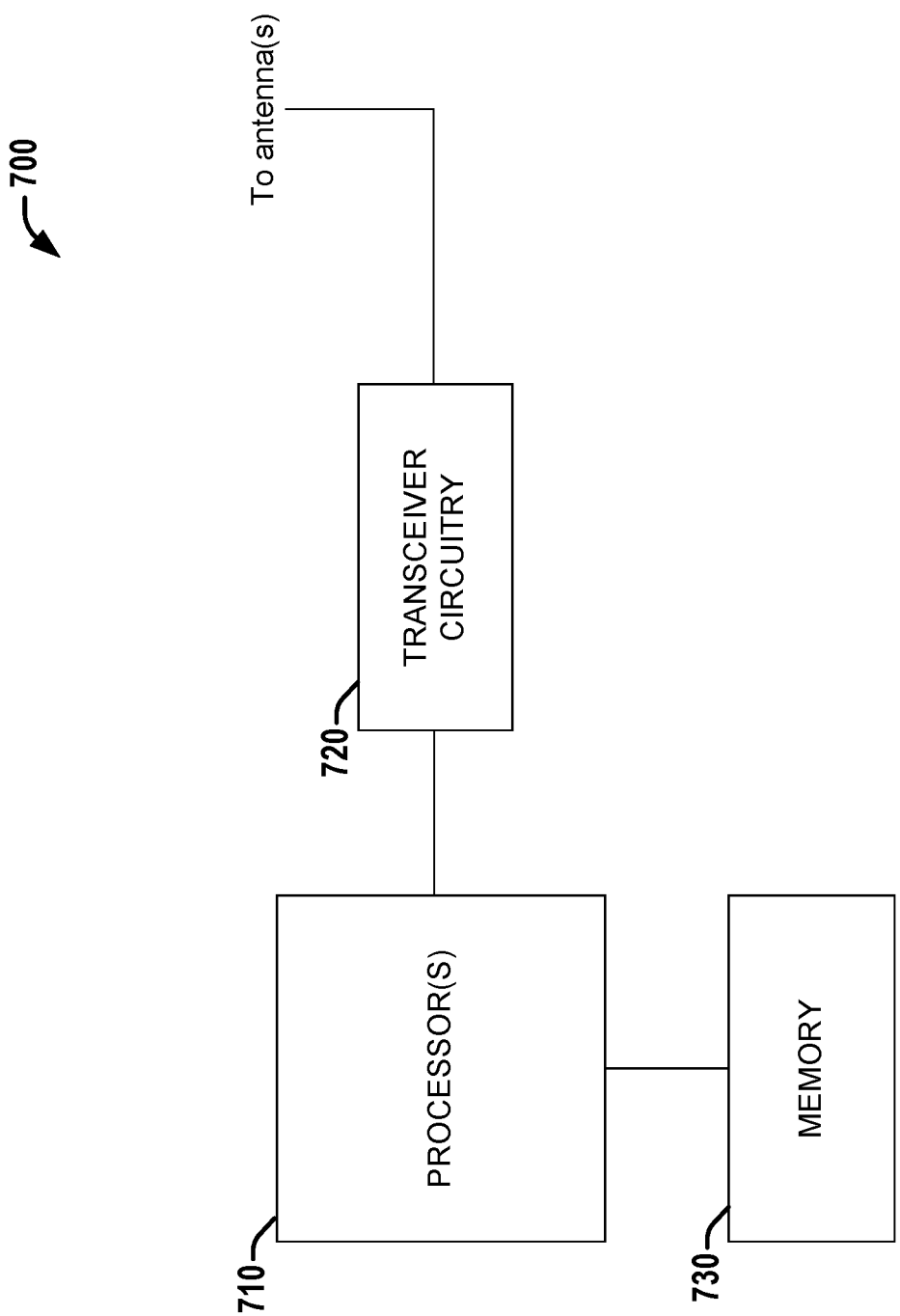
FIG. 7 is a block diagram illustrating a system that facilitates full duplex operation by a UE, according to various aspects described herein.

Referring to FIG. 7, illustrated is a block diagram of a system 700 that facilitates full duplex operation by a UE, according to various aspects described herein. System 700 can include one or more processors 710 (e.g., one or more baseband processors such as one or more of the baseband processors discussed in connection with FIG. 1), transceiver circuitry 720 (e.g., comprising one or more of transmitter circuitry or receiver circuitry, which can employ common circuit elements, distinct circuit elements, or a combination thereof), and a memory 730 (which can comprise any of a variety of storage mediums and can store instructions and/or data associated with one or more of processor(s) 710 or transceiver circuitry 720). In various aspects, system 700 can be included within a user equipment (UE). As described in greater detail below, system 700 can facilitate simultaneous transmission and reception via distinct subarrays of a UE.

Transceiver circuitry 720 can receive, and processor(s) 710 can process, a set of DCI messages for a UE comprising system 700. The set of DCI messages can comprise a first DCI message that indicates a DL assignment for the UE during a subframe via a first link that comprises a first set of UE subarrays. In various aspects, the first DCI message can indicate that the subframe is a DL subframe (e.g., has a DL subframe structure, etc.) for the first set of UE subarrays and/or can indicate a number of APs for CSI-RS associated with the DL assignment. Additionally, the set of DCI messages can comprise a second DCI message that indicates a UL grant for the UE during the subframe via a second link that comprises a second set of UE subarrays. In various aspects, the second DCI message can indicate that the subframe is a UL subframe (e.g., has a UL subframe structure, etc.) for the second set of UE subarrays and/or can indicate a number of APs for SRS associated with the UL grant.

Additionally, transceiver circuitry 720 can receive via the first set of subarrays, and processor(s) 710 can process, DL data received via the DL assignment. The DL data can be received from a first eNB via a first set of physical resources (e.g., indicated via the DL assignment) during the subframe in a frequency band.

Processor(s) 710 can output a set of UL data to transceiver circuitry 720 for transmission via the second set of UE subarrays via the UL grant. The UL data can be transmitted to a second eNB via a second set of physical resources (e.g., indicated via the UL grant) during the subframe in the frequency band.

In some aspects, the first set of physical resources and the second set of physical resources can (but need not) comprise an overlapping set of time domain resources (e.g., OFDM symbols), facilitating simultaneous transmission and reception in the frequency band.

Additionally, in various aspects, the first set of physical resources and the second set of physical resources can be partially or wholly overlapping in the frequency domain (e.g., subcarrier(s)). In other aspects, the first set of physical resources and the second set of physical resources can be non-overlapping in the frequency domain, which can facilitate mitigation of interference caused on reception of the set of DL data by transmission of the set of UL data.

In various aspects, the first eNB can be distinct from the second eNB, which can facilitate mitigation of interference caused by transmission of the UL data on reception of the DL data. In other aspects, the first eNB can be the same as the eNB (e.g., in such aspects, additional or alternative interference mitigation techniques can be employed, such as distinct frequency domain resources for the UL grant and the DL assignment, or potentially distinct links with sufficient spatial separation (e.g., due to reflection) can be employed for UL and DL between the eNB and UE, if available).

In various aspects, processor(s) 710 can select (and transceiver circuitry 720 can apply) a first set of beamforming weights to the first set of UE subarrays and a distinct second set of beamforming weights to the second set of UE subarrays (e.g., when the first eNB is distinct from the second eNB, when multiple useable links exist between the UE and a single eNB, etc.). In some such aspects, processor(s) 710 can select the first set of beamforming weights and/or the second set of beamforming weights to minimize an interference on the DL reception by the UL transmission, or to reduce that interference below a threshold value (e.g., which can be based on a level of interference mitigation available at the UE, etc.).

Figure 8:
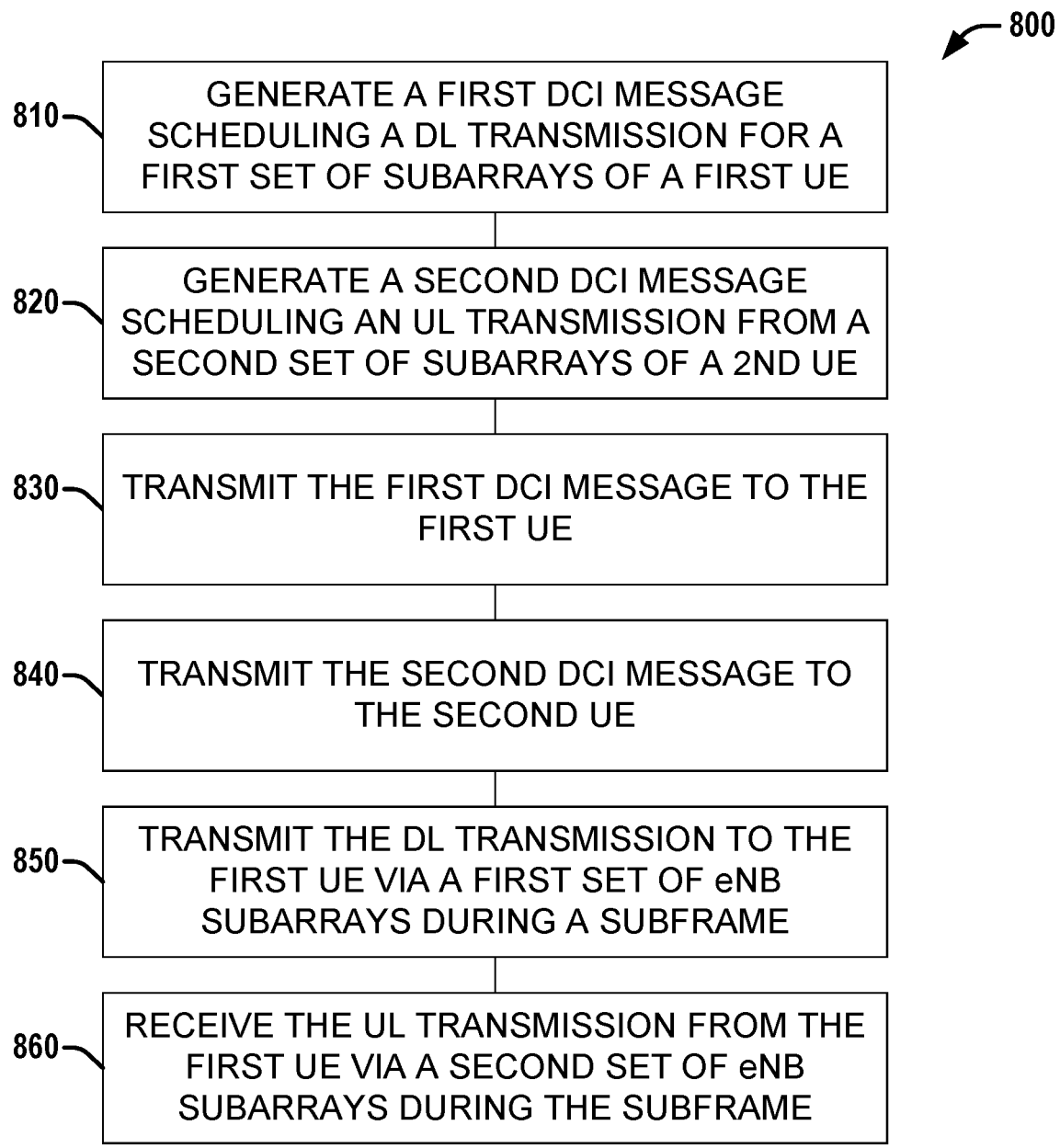
FIG. 8 is a flow diagram illustrating a method that facilitates simultaneous transmission and reception in a frequency band by a base station according to various aspects described herein.

Referring to FIG. 8, illustrated is a flow diagram of a method 800 that facilitates simultaneous transmission and reception in a frequency band by a base station according to various aspects described herein. In some aspects, method 800 can be performed at an eNB. In other aspects, a machine readable medium can store instructions associated with method 800 that, when executed, can cause an eNB to perform the acts of method 800.

At 810, a first DCI message can be generated that schedules a DL transmission in a subframe and a frequency band to a first UE via a first set of UE subarrays of the first UE.

At 820, a second DCI message can be generated that schedules a UL transmission in the subframe and the frequency band from a second UE via a second set of UE subarrays of the second UE.

At 830, the first DCI message can be transmitted to the first UE.

At 840, the second DCI message can be transmitted to the second UE.

At 850, the DL transmission can be transmitted to the first UE via a first set of eNB subarrays during the subframe via a first subset of the frequency band.

At 860, the UL transmission can be received from the second UE via a second set of eNB subarrays during the subframe via a second subset of the frequency band. Depending on the embodiment, the first subset of the frequency band and the second subset of the frequency band can be non-overlapping, partially overlapping, or wholly overlapping.

Figure 9:
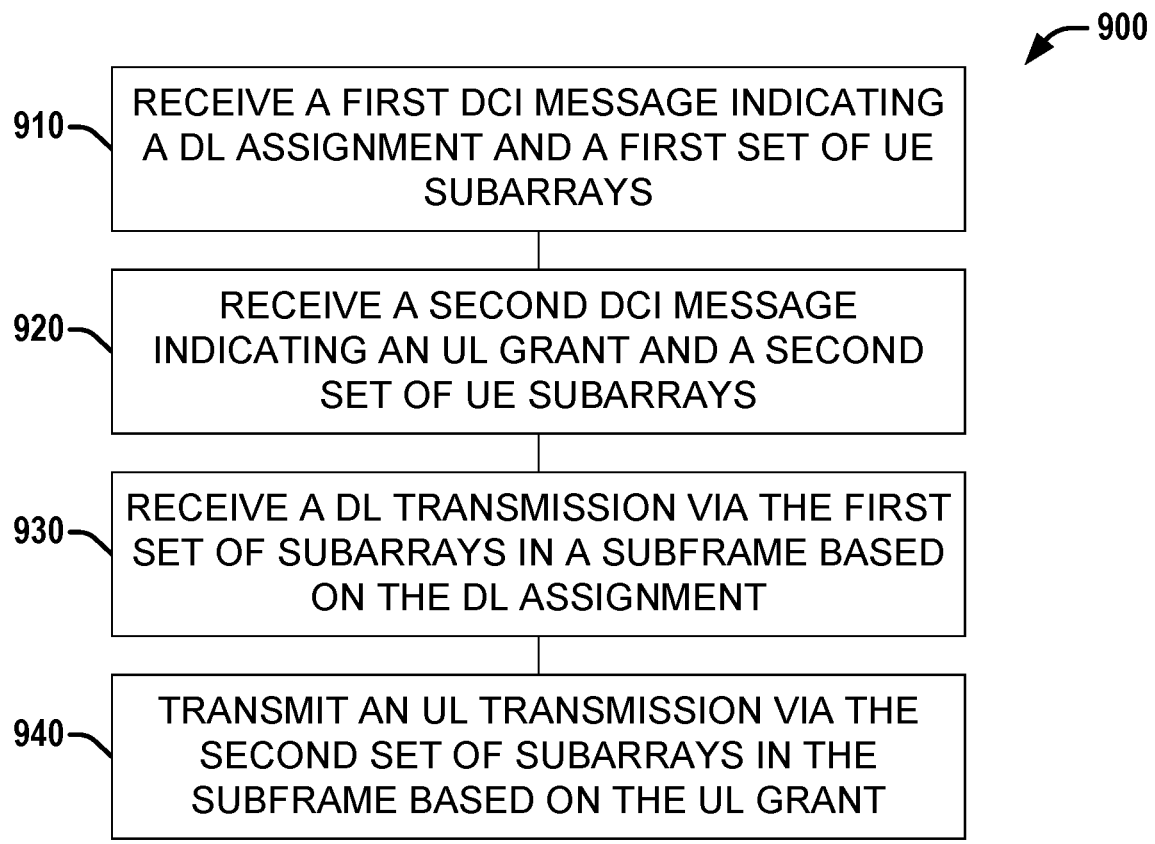
FIG. 9 is a flow diagram illustrating a method that facilitates simultaneous transmission and reception in a frequency band by a UE according to various aspects described herein.

Referring to FIG. 9, illustrated is a flow diagram of a method 900 that facilitates simultaneous transmission and reception in a frequency band by a UE according to various aspects described herein. In some aspects, method 900 can be performed at a UE. In other aspects, a machine readable medium can store instructions associated with method 900 that, when executed, can cause a UE to perform the acts of method 900.

At 910, a first DCI message can be received that indicates a DL assignment and a first set of UE subarrays to receive a DL transmission in connection with the DL assignment.

At 920, a second DCI message can be received that indicates a UL grant and a second set of UE subarrays to transmit a UL transmission in connection with the UL grant.

At 930, based on the DL assignment, the DL transmission can be received via the first set of subarrays in a subframe and a frequency band.

At 940, based on the UL grant, the UL transmission can be transmitted via the second set of subarrays in the subframe and the frequency band.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed within an Evolved NodeB (eNB), comprising one or more processors configured to: schedule a downlink (DL) transmission for a subframe to a first User Equipment (UE) via a DL link comprising a first set of eNB subarrays corresponding to a first set of UE subarrays; schedule an uplink (UL) transmission for the subframe from a second UE via an UL link comprising a second set of eNB subarrays corresponding to a second set of UE subarrays; encode a first downlink control information (DCI) message that indicates the DL transmission for the first UE and a second DCI message that indicates the UL transmission for the second UE; modulate a set of DL data for transmission by transceiver circuitry as the DL transmission to the first UE during the subframe via the first set of eNB subarrays; and demodulate a set of UL data received as the UL transmission by the transceiver circuitry from the second UE via the second set of eNB subarrays.

Example 2 comprises the subject matter of any variation of example 1, wherein the first DCI message indicates that the subframe is a DL subframe for the first set of UE subarrays.

Example 3 comprises the subject matter of any variation of example 1, wherein the second DCI message indicates that the subframe is an UL subframe for the second set of UE subarrays.

Example 4 comprises the subject matter of any variation of example 1, wherein the DL transmission and the UL transmission are both scheduled to a common frequency band.

Example 5 comprises the subject matter of any variation of example 4, wherein the DL transmission is scheduled to a first subset of the common frequency band, and the UL transmission is scheduled to a second subset of the common frequency band, wherein the first subset and the second subset are non-overlapping.

Example 6 comprises the subject matter of any variation of example 4, wherein the DL transmission is scheduled to a first subset of the common frequency band, and the UL transmission is scheduled to a second subset of the common frequency band, wherein the first subset and the second subset are overlapping.

Example 7 comprises the subject matter of any variation of any of examples 1-6, wherein the one or more processors are further configured to select a first set of beamforming weights for the first set of eNB subarrays that is distinct from a second set of beamforming weights for the second set of eNB subarrays.

Example 8 comprises the subject matter of any variation of example 7, wherein the one or more processors are further configured to select the first set of beamforming weights to minimize an interference created by the DL transmission on the UL transmission.

Example 9 comprises the subject matter of any variation of any of examples 1-6, wherein the first DCI message indicates a number of channel state information (CSI) reference signal (CSI-RS) antenna ports (APs) associated with the DL transmission.

Example 10 comprises the subject matter of any variation of any of examples 1-6, wherein the second DCI message indicates a number of sounding reference signal (SRS) antenna ports (APs) associated with the UL transmission.

Example 11 comprises the subject matter of any variation of any of examples 1-6, wherein the first UE is distinct from the second UE.

Example 12 comprises the subject matter of any variation of any of examples 1-2, wherein the second DCI message indicates that the subframe is an UL subframe for the second set of UE subarrays.

Example 13 comprises the subject matter of any variation of any of examples 1-2 or 12, wherein the DL transmission and the UL transmission are both scheduled to a common frequency band.

Example 14 comprises the subject matter of any variation of example 13, wherein the DL transmission is scheduled to a first subset of the common frequency band, and the UL transmission is scheduled to a second subset of the common frequency band, wherein the first subset and the second subset are non-overlapping.

Example 15 comprises the subject matter of any variation of any of examples 13-14, wherein the DL transmission is scheduled to a first subset of the common frequency band, and the UL transmission is scheduled to a second subset of the common frequency band, wherein the first subset and the second subset are overlapping.

Example 16 comprises the subject matter of any variation of any of examples 1-2 or 12-15, wherein the one or more processors are further configured to select a first set of beamforming weights for the first set of eNB subarrays that is distinct from a second set of beamforming weights for the second set of eNB subarrays.

Example 17 comprises the subject matter of any variation of example 16, wherein the one or more processors are further configured to select the first set of beamforming weights to minimize an interference created by the DL transmission on the UL transmission.

Example 18 comprises the subject matter of any variation of any of examples 1-2 or 12-17, wherein the first DCI message indicates a number of channel state information (CSI) reference signal (CSI-RS) antenna ports (APs) associated with the DL transmission.

Example 19 comprises the subject matter of any variation of any of examples 1-2 or 12-18, wherein the second DCI message indicates a number of sounding reference signal (SRS) antenna ports (APs) associated with the UL transmission.

Example 20 comprises the subject matter of any variation of any of examples 1-2 or 12-19, wherein the first UE is distinct from the second UE.

Example 21 comprises the subject matter of any variation of example 1, wherein the one or more processors are further configured to select a first set of beamforming weights for the first set of eNB subarrays that is distinct from a second set of beamforming weights for the second set of eNB subarrays.

Example 22 comprises the subject matter of any variation of example 21, wherein the one or more processors are further configured to select the first set of beamforming weights to minimize an interference created by the DL transmission on the UL transmission.

Example 23 comprises the subject matter of any variation of example 1, wherein the first DCI message indicates a number of channel state information (CSI) reference signal (CSI-RS) antenna ports (APs) associated with the DL transmission.

Example 24 comprises the subject matter of any variation of example 1, wherein the second DCI message indicates a number of sounding reference signal (SRS) antenna ports (APs) associated with the UL transmission.

Example 25 comprises the subject matter of any variation of example 1, wherein the first UE is distinct from the second UE.

Example 26 is a machine readable medium comprising instructions that, when executed, cause an Evolved NodeB (eNB) to: encode a first set of downlink control information (DCI) messages that schedule a downlink (DL) transmission to a first user equipment (UE) over a DL link during a subframe in a frequency band, wherein the DL link comprises a first set of eNB subarrays corresponding to a first set of UE subarrays; encode a second set of DCI messages that schedule an uplink (UL) transmission from a second UE over an UL link during the subframe in the frequency band, wherein the DL link comprises a second set of eNB subarrays corresponding to a second set of UE subarrays; transmit the first set of DCI messages to the first UE; transmit the second set of DCI messages to the second UE; transmit the DL transmission during the subframe to the first UE via the first set of eNB subarrays, wherein the DL transmission is transmitted via a first subset of the frequency band; and receive the UL transmission during the subframe from the second UE via the second set of eNB subarrays, wherein the UL transmission is received via a second subset of the frequency band.

Example 27 comprises the subject matter of any variation of example 26, wherein the first subset of the frequency band and the second subset of the frequency band are non-overlapping subsets of the frequency band.

Example 28 comprises the subject matter of any variation of example 26, wherein the first subset of the frequency band and the second subset of the frequency band are overlapping subsets of the frequency band.

Example 29 comprises the subject matter of any variation of any of examples 26-28, wherein the instructions further cause the eNB to: select a first set of beamforming weights for the first set of eNB subarrays, wherein the first set of beamforming weights is selected to minimize an interference caused by the DL transmission on the UL transmission.

Example 30 comprises the subject matter of any variation of any of examples 26-28, wherein the first set of DCI messages indicate that the subframe is a DL subframe for the first UE.

Example 31 comprises the subject matter of any variation of any of examples 26-28, wherein the first set of DCI messages indicate a number of channel state information (CSI) reference signal (CSI-RS) antenna ports (APs) associated with the DL transmission.

Example 32 comprises the subject matter of any variation of any of examples 26-28, wherein the second set of DCI messages indicate that the subframe is an UL subframe for the second UE.

Example 33 comprises the subject matter of any variation of any of examples 26-28, wherein the second set of DCI messages indicate a number of sounding reference signal (SRS) antenna ports (APs) associated with the UL transmission.

Example 34 comprises the subject matter of any variation of any of examples 26-28, wherein the DL transmission and the UL transmission employ orthogonal frequency division multiplexing (OFDM).

Example 35 comprises the subject matter of any variation of any of examples 26-27, wherein the first subset of the frequency band and the second subset of the frequency band are overlapping subsets of the frequency band.

Example 36 comprises the subject matter of any variation of example 26, wherein the instructions further cause the eNB to: select a first set of beamforming weights for the first set of eNB subarrays, wherein the first set of beamforming weights is selected to minimize an interference caused by the DL transmission on the UL transmission.

Example 37 comprises the subject matter of any variation of example 26, wherein the first set of DCI messages indicate that the subframe is a DL subframe for the first UE.

Example 38 comprises the subject matter of any variation of example 26, wherein the first set of DCI messages indicate a number of channel state information (CSI) reference signal (CSI-RS) antenna ports (APs) associated with the DL transmission.

Example 39 comprises the subject matter of any variation of example 26, wherein the second set of DCI messages indicate that the subframe is an UL subframe for the second UE.

Example 40 comprises the subject matter of any variation of example 26, wherein the second set of DCI messages indicate a number of sounding reference signal (SRS) antenna ports (APs) associated with the UL transmission.

Example 41 comprises the subject matter of any variation of example 26, wherein the DL transmission and the UL transmission employ orthogonal frequency division multiplexing (OFDM).

Example 42 is an apparatus configured to be employed within a User Equipment (UE), comprising one or more processors configured to: decode a set of downlink (DL) control information (DCI) messages that comprises a DL assignment for the UE during a subframe in a frequency band and an uplink (UL) grant for the UE during the subframe in the frequency band, wherein the DL assignment indicates a DL link that comprises a first set of UE subarrays, and wherein the UL grant indicates an UL link that comprises a second set of UE subarrays; demodulate a set of DL data received via transceiver circuitry via the first set of UE subarrays, wherein the set of DL data is received from a first Evolved NodeB (eNB) during the subframe via the frequency band; and modulate a set of UL data for transmission by the transceiver circuitry via the second set of UE subarrays, wherein the set of UL data is output for transmission to a second eNB during the subframe via the frequency band.

Example 43 comprises the subject matter of any variation of example 42, wherein the set of DL data is received via a first subset of the frequency band, wherein the set of UL data is output via a second subset of the frequency band, and wherein the first subset and the second subset are overlapping.

Example 44 comprises the subject matter of any variation of example 42, wherein the set of DL data is received via a first subset of the frequency band, wherein the set of UL data is output via a second subset of the frequency band, and wherein the first subset and the second subset are non-overlapping.

Example 45 comprises the subject matter of any variation of example 42, wherein the one or more processors are configured to output to the transceiver circuitry a first set of beamforming weights to apply to the first set of UE subarrays and a distinct second set of beamforming weights to apply to the second set of UE subarrays.

Example 46 comprises the subject matter of any variation of example 45, wherein the first set of beamforming weights reduce an interference below a threshold value, wherein the interference is caused by reception of the set of DL data on transmission of the set of UL data.

Example 47 comprises the subject matter of any variation of any of examples 42-46, wherein the set of DCI messages indicate a number of channel state information (CSI) reference signal (CSI-RS) antenna ports (APs) associated with the DL assignment.

Example 48 comprises the subject matter of any variation of any of examples 42-46, wherein the set of DCI messages indicate a number of sounding reference signal (SRS) antenna ports (APs) associated with the UL assignment.

Example 49 comprises the subject matter of any variation of any of examples 42-46, wherein the set of DCI messages indicate that the first set of subarrays are associated with a DL subframe structure during the subframe.

Example 50 comprises the subject matter of any variation of any of examples 42-46, wherein the set of DCI messages indicate that the second set of subarrays are associated with an UL subframe structure during the subframe.

Example 51 comprises the subject matter of any variation of any of examples 42-46, wherein the first eNB is distinct from the second eNB.

Example 52 comprises the subject matter of any variation of example 42, wherein the set of DCI messages indicate a number of channel state information (CSI) reference signal (CSI-RS) antenna ports (APs) associated with the DL assignment.

Example 53 comprises the subject matter of any variation of example 42, wherein the set of DCI messages indicate a number of sounding reference signal (SRS) antenna ports (APs) associated with the UL assignment.

Example 54 comprises the subject matter of any variation of example 42, wherein the set of DCI messages indicate that the first set of subarrays are associated with a DL subframe structure during the subframe.

Example 55 comprises the subject matter of any variation of example 42, wherein the set of DCI messages indicate that the second set of subarrays are associated with an UL subframe structure during the subframe.

Example 56 comprises the subject matter of any variation of example 42, wherein the first eNB is distinct from the second eNB.

Example 57 is an apparatus configured to be employed within an Evolved NodeB (eNB), comprising means for processing and means for communication. The means for processing is configured to: encode a first set of downlink control information (DCI) messages that schedule a downlink (DL) transmission to a first user equipment (UE) over a DL link during a subframe in a frequency band, wherein the DL link comprises a first set of eNB subarrays corresponding to a first set of UE subarrays; and encode a second set of DCI messages that schedule an uplink (UL) transmission from a second UE over an UL link during the subframe in the frequency band, wherein the DL link comprises a second set of eNB subarrays corresponding to a second set of UE subarrays. The means for communication is configured to: transmit the first set of DCI messages to the first UE; transmit the second set of DCI messages to the second UE; transmit the DL transmission during the subframe to the first UE via the first set of eNB subarrays, wherein the DL transmission is transmitted via a first subset of the frequency band; and receive the UL transmission during the subframe from the second UE via the second set of eNB subarrays, wherein the UL transmission is received via a second subset of the frequency band.

Example 58 comprises the subject matter of any variation of example 57, wherein the first subset of the frequency band and the second subset of the frequency band are non-overlapping subsets of the frequency band.

Example 59 comprises the subject matter of any variation of example 57, wherein the first subset of the frequency band and the second subset of the frequency band are overlapping subsets of the frequency band.

Example 60 comprises the subject matter of any variation of any of examples 57-59, wherein the means for processing is further configured to select a first set of beamforming weights for the first set of eNB subarrays, wherein the first set of beamforming weights is selected to minimize an interference caused by the DL transmission on the UL transmission.

Example 61 comprises the subject matter of any variation of any of examples 57-59, wherein the first set of DCI messages indicate that the subframe is a DL subframe for the first UE.

Example 62 comprises the subject matter of any variation of any of examples 57-59, wherein the first set of DCI messages indicate a number of channel state information (CSI) reference signal (CSI-RS) antenna ports (APs) associated with the DL transmission.

Example 63 comprises the subject matter of any variation of any of examples 57-59, wherein the second set of DCI messages indicate that the subframe is an UL subframe for the second UE.

Example 64 comprises the subject matter of any variation of any of examples 57-59, wherein the second set of DCI messages indicate a number of sounding reference signal (SRS) antenna ports (APs) associated with the UL transmission.

Example 65 comprises the subject matter of any variation of any of examples 57-59, wherein the DL transmission and the UL transmission employ orthogonal frequency division multiplexing (OFDM).

Example 66 comprises the subject matter of any variation of any of examples 1-25, further comprising the transceiver circuitry.

Example 67 comprises the subject matter of any variation of any of examples 42-56, further comprising the transceiver circuitry.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed within a base station (BS), comprising one or more processors configured to:
    schedule a downlink (DL) transmission for a subframe to a first User Equipment (UE) via a DL link comprising a first set of BS subarrays corresponding to a first set of UE subarrays of the first UE;
    schedule an uplink (UL) transmission for the subframe from a second UE via a UL link comprising a second set of BS subarrays corresponding to a second set of UE subarrays of the second UE;
    encode a first downlink control information (DCI) message that indicates the DL transmission for the first UE, wherein the first DCI message indicates that the subframe is a DL subframe for the first set of UE subarrays;
    encode a second DCI message that indicates the UL transmission for the second UE, wherein the second DCI message indicates that the subframe is an UL subframe for the second set of UE subarrays;
    modulate a set of DL data for transmission by a transceiver circuitry as the DL transmission to the first UE during the subframe via the first set of BS subarrays;
    demodulate a set of UL data received as the UL transmission by the transceiver circuitry from the second UE via the second set of BS subarrays;
    select a first set of beamforming weights to be applied to the first set of BS subarrays to facilitate the DL transmission to the first UE; and
    select a distinct second set of beamforming weights to be applied to the second set of BS subarrays to facilitate reception of the UL transmission from the second UE;
    wherein the DL transmission is scheduled via a first set of physical resources and the UL transmission is scheduled via a second set of physical resources, and wherein the first set of physical resources and the second set of physical resources overlap wholly or partially in time domain and frequency domain.

2. The apparatus of claim 1, wherein the DL transmission and the UL transmission are both scheduled to a common frequency band.

3. The apparatus of claim 1, wherein the one or more processors are further configured to select the first set of beamforming weights to minimize an interference created by the DL transmission on the UL transmission.

4. The apparatus of claim 1, wherein the first DCI message indicates a number of channel state information (CSI) reference signal (CSI-RS) antenna ports (APs) associated with the DL transmission.

5. The apparatus of claim 1, wherein the second DCI message indicates a number of sounding reference signal (SRS) antenna ports (APs) associated with the UL transmission.

6. The apparatus of claim 1, wherein the first UE is distinct from the second UE.

7. A non-transitory machine readable medium comprising instructions that, when executed, cause a base station (BS) to:
    encode a first set of downlink control information (DCI) messages that schedule a downlink (DL) transmission to a first user equipment (UE) over a DL link during a subframe in a frequency band, wherein the DL link comprises a first set of BS subarrays corresponding to a first set of UE subarrays of the first UE;
    encode a second set of DCI messages that schedule an uplink (UL) transmission from a second UE over a UL link during the subframe in the frequency band, wherein the UL link comprises a second set of BS subarrays corresponding to a second set of UE subarrays of the second UE;
    wherein the DL transmission is scheduled via a first set of physical resources and the UL transmission is scheduled via a second set of physical resources, and wherein the first set of physical resources and the second set of physical resources overlap wholly or partially in time domain and frequency domain;
    transmit the first set of DCI messages to the first UE, wherein the first set of DCI messages indicate that the subframe is a DL subframe for the first set of UE subarrays;
    transmit the second set of DCI messages to the second UE, wherein the second set of DCI messages indicate that the subframe is a UL subframe for the second set of UE subarrays;
    select a first set of beamforming weights to be applied to the first set of BS subarrays to facilitate the DL transmission to the first UE; and
    select a distinct second set of beamforming weights to be applied to the second set of BS subarrays to facilitate reception of the UL transmission from the second UE.

8. The non-transitory machine readable medium of claim 7, wherein the instructions further cause the BS to:
    select the first set of beamforming weights for the first set of BS subarrays to minimize an interference caused by the DL transmission on the UL transmission.

9. The non-transitory machine readable medium of claim 7, wherein the first set of DCI messages indicate a number of channel state information (CSI) reference signal (CSI-RS) antenna ports (APs) associated with the DL transmission.

10. The non-transitory machine readable medium of claim 7, wherein the second set of DCI messages indicate a number of sounding reference signal (SRS) antenna ports (APs) associated with the UL transmission.

11. The non-transitory machine readable medium of claim 7, wherein the DL transmission and the UL transmission employ orthogonal frequency division multiplexing (OFDM).

12. An apparatus configured to be employed within a User Equipment (UE), comprising one or more processors configured to: decode a set of downlink (DL) control information (DCI) messages that comprises a DL assignment for the UE during a subframe in a frequency band and an uplink (UL) grant for the UE during the subframe in the frequency band, wherein the DL assignment indicates a DL link that comprises a first set of UE subarrays, and wherein the UL grant indicates a UL link that comprises a second set of UE subarrays; demodulate a set of DL data received by a transceiver circuitry via the first set of UE subarrays, wherein the set of DL data is received from a first base station (BS) during the subframe via the frequency band; and modulate a set of UL data for transmission by the transceiver circuitry via the second set of UE subarrays, wherein the set of UL data is output for transmission to a second BS during the subframe via the frequency band; select and output to the transceiver circuitry a first set of beamforming weights to apply to the first set of UE subarrays, and select and output to the transceiver circuitry a distinct second set of beamforming weights to apply to the second set of UE subarrays; wherein the set of DL data is received via a first set of physical resources indicated by the DL assignment and the set of UL data is transmitted via a second set of physical resources indicated by the UL grant, and wherein the first set of physical resources and the second set of physical resources overlap wholly or partially in time domain and frequency domain.

13. The apparatus of claim 12, wherein the first set of beamforming weights reduce an interference below a threshold value, wherein the interference is caused by reception of the set of DL data on transmission of the set of UL data.

14. The apparatus of claim 12, wherein the set of DCI messages indicate a number of channel state information (CSI) reference signal (CSI-RS) antenna ports (APs) associated with the DL assignment.

15. The apparatus of claim 12, wherein the set of DCI messages indicate a number of sounding reference signal (SRS) antenna ports (APs) associated with the UL grant.

16. The apparatus of claim 12, wherein the set of DCI messages indicate that the first set of UE subarrays are associated with a DL subframe structure during the subframe.

17. The apparatus of claim 12, wherein the set of DCI messages indicate that the second set of UE subarrays are associated with a UL subframe structure during the subframe.

18. The apparatus of claim 12, wherein the first BS is distinct from the second BS.

* * * * *